United States Patent [19]

Betz et al.

[11] Patent Number: 5,425,047
[45] Date of Patent: Jun. 13, 1995

[54] CLOSED INDUCTION FURNACE WITH A TILTING APPARATUS

[75] Inventors: Ulrich Betz, Hasselroth; Hans Kemmer, Rödermark; Martin Lorke, Offenbach am Main; Klaus Pfeuffer, Mainaschaff; Otto Stenzel, Neuhütten, all of Germany

[73] Assignee: Leybold Durferrit GmbH, Cologne, Germany

[21] Appl. No.: 36,717

[22] Filed: Mar. 25, 1993

[30] Foreign Application Priority Data

Jun. 3, 1992 [DE] Germany ............... 42 18 244.1

[51] Int. Cl.⁶ .................................................. F27D 3/00
[52] U.S. Cl. ............................................ 373/143; 373/142
[58] Field of Search .................... 373/142, 143, 151, 84

[56] References Cited

U.S. PATENT DOCUMENTS

| 2,520,598 | 8/1950 | Harker et al. | 373/143 |
|---|---|---|---|
| 3,311,361 | 3/1967 | Zepernick | 373/143 |
| 3,350,083 | 10/1967 | Buhrer et al. | 373/143 |
| 3,486,745 | 12/1969 | Fadler | 373/143 |
| 4,658,404 | 4/1987 | Sick et al. | 373/143 |

FOREIGN PATENT DOCUMENTS

| 1207554 | 3/1962 | Germany . |
|---|---|---|
| 1201954 | 12/1963 | Germany . |
| 9013521 | 9/1990 | Germany . |

Primary Examiner—Bruce A. Reynolds
Assistant Examiner—Tu Hoang
Attorney, Agent, or Firm—Felfe & Lynch

[57] ABSTRACT

An induction furnace with a crucible having a crucible axis, an induction coil and a furnace body containing a gas-tight jacket, and also with a cover which can be placed on the furnace body and has at least one gas connection, a charging valve and a pouring apparatus, the furnace body and cover being joined together releasably but hermetically by a flange connection, and being journaled in the joined state in a furnace frame by a tilting mechanism which engages the cover, and after the flange connection is separated the cover body can be removed from the furnace body which remains in the furnace frame.

7 Claims, 2 Drawing Sheets

CLOSED INDUCTION FURNACE WITH A TILTING APPARATUS

BACKGROUND OF THE INVENTION

The invention relates to an induction furnace with a crucible having a crucible axis, an induction coil and a furnace body containing a gas-tight jacket, and also with a cover which can be placed on the furnace body and has at least one gas connection, a charging valve and a pouring apparatus, the furnace body and cover being joined together releasably but hermetically by a flange connection, and being journaled in the joined state in a furnace frame by a tilting mechanism which engages the cover, and after the flange connection is separated the furnace body can be removed from the cover which remains in the furnace frame.

An induction furnace of this kind, which is disclosed by German Patent 35 30 471 has the advantages that the cover serves as a reference platform which always remains in the furnace frame due to the bearings referred to, and all additional fittings, such as gas connections, the charging valve, the pouring system, and the measurement and observation devices can remain on the cover.

In the known system, however, only one coaxial pair of tilting bearings is present, whose common axis runs through the end of the pouring spout, so that, while pouring, transverse displacement of the overflow lip of the pouring spout will be minimized and the melt can also be poured off through a pouring tube surrounding the tilt axis. This arrangement, which is advantageous in itself, leads, however, to a comparatively high elevation of the only tilt axis above the floor, so that the induction furnace can also be brought into an opposite tilted position for the purpose of a slag removal operation without having the furnace body strike against the floor.

Through U.S. Pat. No. 3,350,083 it is known to arrange a single pair of tilt bearings such that the common tilt axis intersects the crucible axis at a right angle. This, however, has the consequence that the outlet opening of the pouring spout and the overflow edge of the slag removal lip move upon tilting in the corresponding direction on relatively long arcuate paths, so that not only an additionally provided pouring ladle but also a slag pot have to be suspended independently of one another on additional pivots in order to be able at all to perform a controlled pour or a controlled slag removal.

Through U.S. Pat. Nos. 3,311,361 and 3,486,745 it is known to provide induction furnaces with tilt bearings on both sides of the crucible axis, which are arranged each in the area of the pouring spout and the overflow edge of the slag removal trough and which are to be alternately unlocked according to whether a pouring of the metal or a slag removal is to be performed. Since in the case of a pouring or a slag removal operation a tilt bearing or pair of tilt bearings has to be brought out of engagement, the stability of the furnace mounting is imperiled unless an extremely heavy furnace frame with appropriate safety devices is acceptable.

The last-described furnace mountings, however, are always disposed on the furnace bottom, so that the advantages achieved by German Patent 35 30 471 have to be surrendered.

SUMMARY OF THE INVENTION

The invention is therefore addressed to the problem of improving a closed induction furnace of the kind described above, in which the furnace cover or at least a substantial part of it remains constantly in the furnace frame, so that the charging, the pouring of the molten metal and the slag removal operation can be performed in a simpler manner, while at the same time improving the stability of the furnace mounting.

The solution of the stated problem is accomplished in accordance with the invention in the induction furnace described above in that the cover is provided at its flanged junction with the furnace body with first rocking arms disposed on both sides and arranged parallel to the plane of rotation of the crucible axis; these shafts are joined at their extremities, by means of first tilt bearings, to second rocking arms which are connected to the furnace frame at the ends remote from the first tilt bearings by second tilt bearings, the first and the second tilt bearings being selectively locked up such that the induction furnace can be tilted alternatively and oppositely about the first or the second tilt bearings, and that the common axis of the first tilt bearings lie on the one side of the crucible axis, and the common axis of the second tilt bearings lie on the other side of the crucible axis.

In the manner described, a bilateral tilting mounting of the closed induction furnace is achieved, which is constantly in engagement. In other words: the two pairs of tilt bearings, whose common axes lie preferably in a horizontal plane, with the furnace in the melting position, are constantly in engagement, and are released alternately only as regards the tilting movement, so that a very reliable mounting of the furnace is achieved.

As a result of an additional configuration of the subject matter of the invention it is especially advantageous if the cover is bipartite and consists of a lower cover part connected to the first rocking arms, and of a removable upper cover part, both being joined together by a releasable flange joint with a parting seam between them.

This entails the additional advantage that the upper cover remains gas-tight on the bottom cover and on the furnace body during the pouring, so that the furnace can be filled with inert gas at ambient pressure. On the other hand, the furnace can be operated with the upper cover removed for the charging and the treatment of the melt.

For a vacuum treatment or protective gas treatment of the melt a vacuum connection is provided on the bottom cover. The simplest solution is a vacuum connection with a shut-off valve on a vertically standing furnace on a fixed vacuum line. Such a connection has to be released before the induction furnace is tilted. If the furnace should be tippable under vacuum, a more complex solution is necessary, which can be achieved with flexible lines. A flexible line of this kind can be in the form of a flexible hose or of a swivel-joint pipe. A swivel-joint pipe is best disposed on one of the tilting axes of the furnace.

It is, again, especially advantageous if the seam between the upper cover and the crucible body is at an angle other than 90 degrees to the crucible axis, and the highest point of the seam when the crucible axis is vertical is above the pouring opening of the crucible.

This construction permits better access to the crucible for maintenance, cleaning and charging.

In accordance with the invention, an induction furnace comprises a crucible having a crucible axis ($A_T$—$A_T$), an induction coil, a furnace body containing a gas-tight jacket (3), a bipartite cover (6) which is disposed on the furnace body and has at least one gas connection, a pouring apparatus, a flange connection for joining the furnace body and bipartite cover together releasably but hermetically, a furnace frame (18) having a tilting mechanism (21) which engages the cover, the furnace body and bipartite cover being journaled in a joined state in the furnace frame and after the flange connection is separated a part of the cover being removable from the furnace body, the cover having first rocking arms disposed on both sides and parallel to a pivot plane of the crucible axis ($A_T—A_T$) The furnace includes first and second tilt bearings, second rocking arms, the first rocking arms being joined at their extremities via said first tilt bearings to the second rocking arms which are connected at extremities remote from the first tilt bearings via the second tilt bearings to the furnace frame, the first and the second tilt bearings being selectively lockable such that the induction furnace can be pivoted in opposite directions alternatively about the first tilt bearings or the second tilt bearings, and that a common axis ($A_2—A_2$) of the second tilt bearings (16, 17) lies on the other side of the crucible axis ($A_T—A_T$) from a common axis ($A_1—A_1$) of the first tilt bearings.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

DESCRIPTION OF A PREFERRED EMBODIMENT

Figure 1:
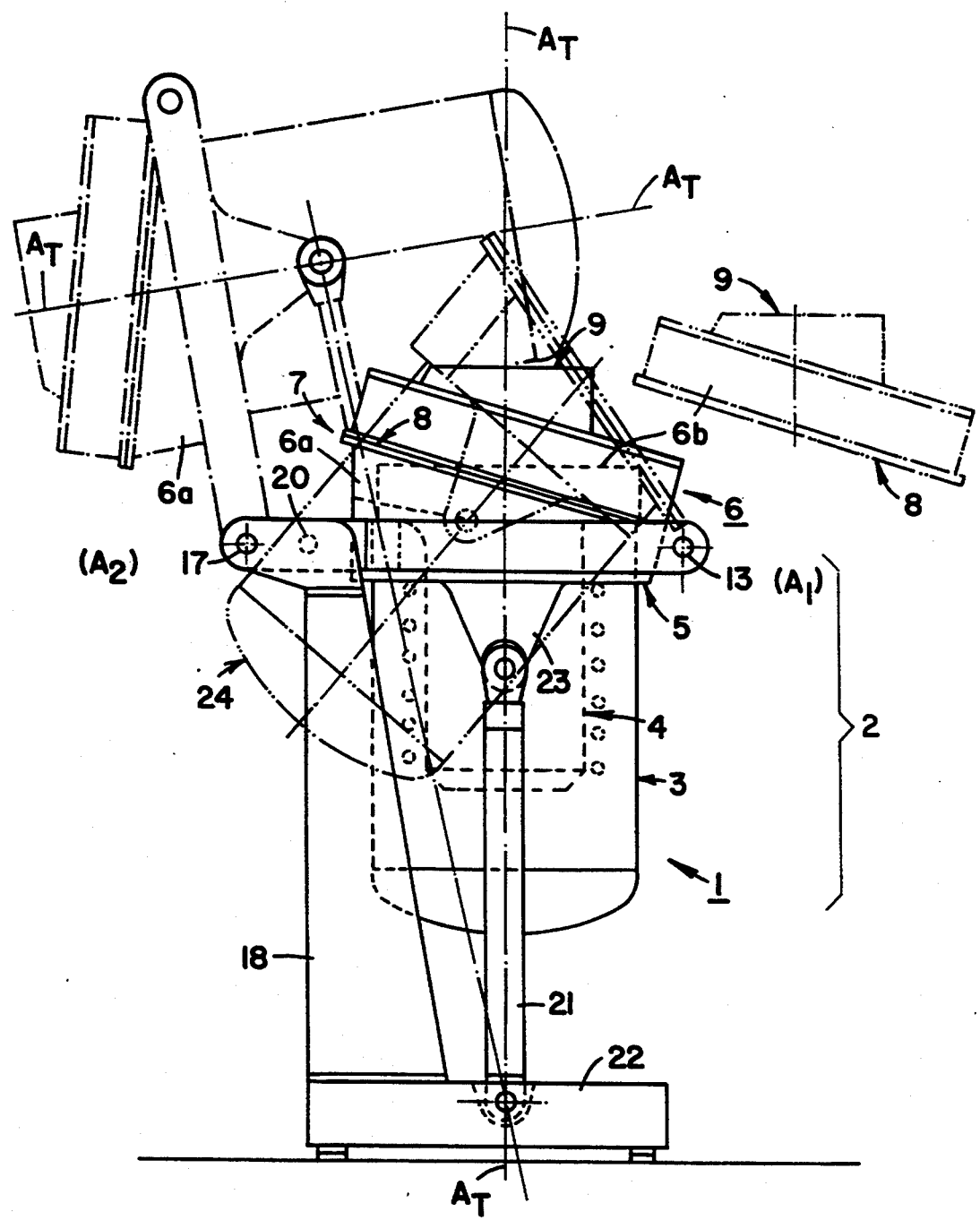
FIG. 1 is a side elevation of the complete induction furnace in three different possible tilted positions.
Figure 2:
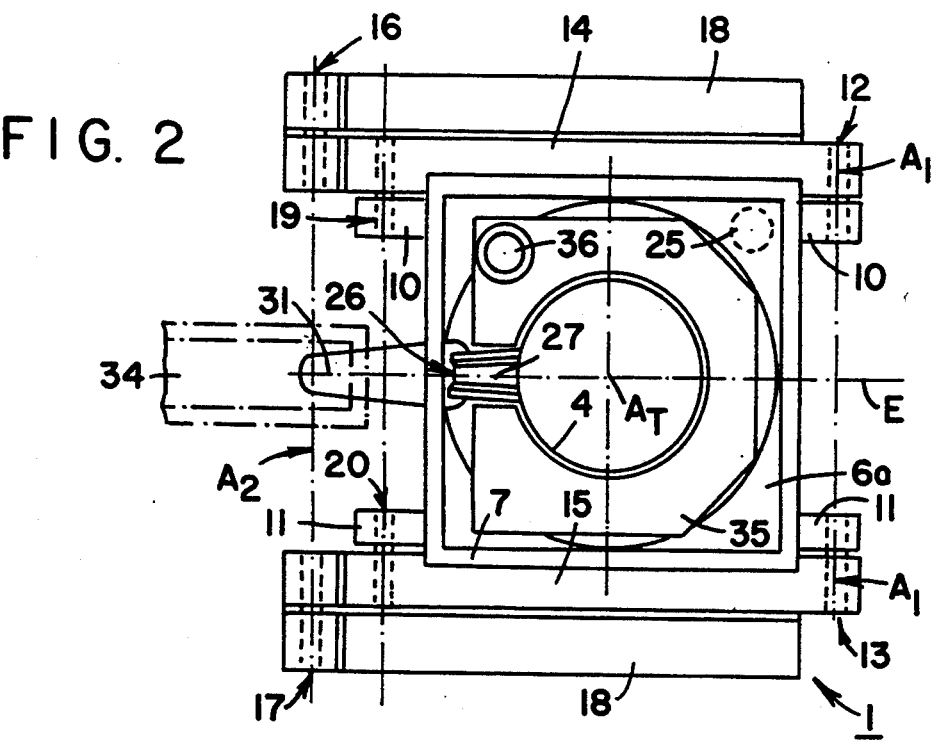
FIG. 2 is a top plan view the subject of FIG. 1 with the upper cover removed.

In FIGS. 1 and 2 there is shown a closed induction furnace 1 which has a body part 2 which has a gas-tight jacket 3 and a crucible 4 disposed concentrically therein and represented only schematically. Between the crucible 4 and the gas-tight jacket 3 there is an induction coil, which is not indicated.

On the furnace body 2 there is placed, at a first seam 5 not especially highlighted, a bipartite cover 6 which consists of a bottom cover part 6a with an approximately square configuration and a top cover 6b; the cover parts are joined together hermetically by a releasable flange joint 7. Inside of the flange joint 7 there is a second, planar seam 8. By releasing this flange joint the top cover 6b can be brought into the position represented in dash-dotted lines in FIG. 1. The top cover 6b again has a planar top side 9 which can be provided with openings for the connection of charging, measuring, sampling and observation systems not shown here.

In the area of its connection to the furnace body 2, the cover 6, or more precisely its bottom part 6a, is provided with first rocking arms 10 and 11 disposed on both sides and parallel to the pivot plane E of the crucible axis $A_T—A_T$, which are connected at their extremities by first tilt bearings 12 and 13 to second rocking arms 14 and 15 which are connected at the ends remote from the first tilt bearings 12 and 13 to the furnace frame 18 via two tilt bearings 16 and 17.

With the furnace in the melting position, in which the crucible axis $A_T$ is perpendicular, the two axes of the first and second rocking arms are in a horizontal plane, as can be seen in FIG. 1. Between the first and second rocking arms running parallel to one another in the said melting position, locking means 19 and 20 are provided on both sides of the tilt plane E, by which the movement of the first rocking arms 10 and 11 with respect to the second rocking arms 14 and 15 can be prevented, so that in this case only one movement of the furnace about the second tilt bearings 16 and 17 is possible. The end position of this tilting movement is represented in FIG. 1, top left.

To produce the different tilting movements the furnace frame 18 is provided with a tilting drive 21 which consists of two long-stroke hydraulic jacks disposed on opposite sides. The bottom ends of these jacks are journaled in a base frame 22, while the upper ends of the piston rods engage each a gusset plate 23 on the furnace body 2 at the first rocking arms 10 and 11.

When the locking means 19 and 20 are activated, the induction furnace is tilted about the second tilt bearings 16 and 17 to various pouring positions, whose end position is represented in FIG. 1, upper left.

After the locking means 19 and 20 are released, the furnace is then rocked by the tilting drive 21 about the first tilt bearings 12 and 13 on the right, while the second rocking arms 14 and 15 remain in the rest position. In this case the furnace performs a tilting movement as indicated in FIG. 1 by the dash-dotted line 24. In such a tilting movement a slag removal operation is usually performed.

It also appears from FIG. 2 that the bottom part 6a of the cover, which due to its rectangular shape reaches beyond the substantially cylindrical furnace body 2, is provided with a gas connection 25 which leads to a vacuum pump or vacuum pump unit which is not shown here.

Figure 3:
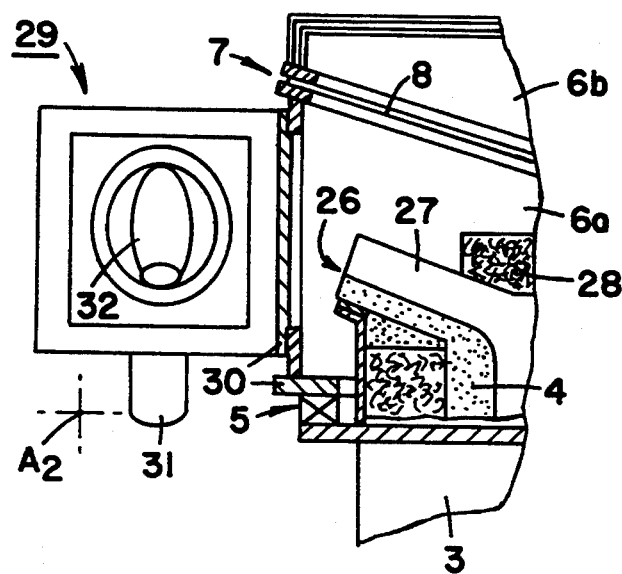
FIG. 3 is a fragmentary vertical enlarged section through an induction furnace in the area of the pouring orifice during a melting operation.
Figure 4:
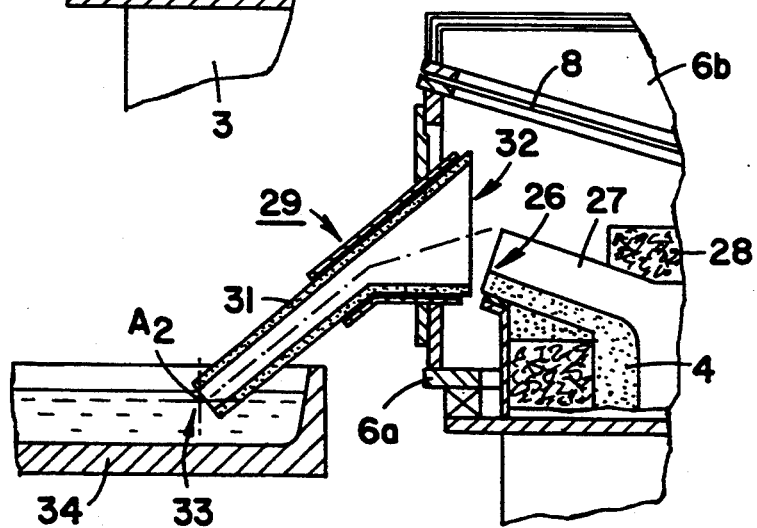
FIG. 4 is a fragmentary vertical section like FIG. 3, but in a position immediately before pouring.

In FIGS. 2, 3 and 4 it can furthermore be seen that the crucible 4 has an overflow lip 26 which is disposed at the outer end of a so-called "pouring spout" 27 which is partially covered over by the margin of a ceramic inside cover 28.

The overflow lip 26 can be set in front of a casting apparatus 29 which will be further explained with the aid of FIGS. 3 and 4.

The bottom part 6a of the cover has at the overflow lip 26 of the crucible 4 a stopper 30 by which the interior of the furnace is sealed gas-tight during the melting (FIG. 3). For pouring purposes the stopper 30 is replaced by a swiveling pouring spout 31 whose inlet end 32 is swung in front of the overflow lip 26 of the crucible 4 and whose outlet opening 33 is disposed in a pouring trough 34. The last-named parts together form the pouring apparatus 29 (FIG. 4).

It is also to be seen in FIGS. 2, 3 and 4 that the axis of the pouring spout 31 (in its working position) intersects the axis $A_2$ of the second tilt bearings 16 and 17. This intersection is also situated inside of the pouring trough 34 (FIG. 4). This assures that the point at which the melt enters into the pouring trough 34 is not displaced as the tilt of the crucible increases, which is of decisive importance for a uniform pouring.

It can be seen from FIG. 2 also that in the bottom part 6a of the cover an exhaust system 35 is provided, which consists of a hollow body in the shape of a C, which nearly forms a ring. This hollow body is open at the confronting inner faces and, after removal of the upper part 6b of the cover, it can be connected through a connection 36 to an exhaust fan, thereby preventing emissions of gases and smoke which might otherwise occur after the removal of the top part 6b of the cover.

Again, it can be seen from FIGS. 1, 3 and 4 that the seam 8 between the upper part 6b and the bottom part 6a of the cover is at an angle other than 90 degrees to the crucible axis $A_T$—$A_T$. Thus the highest point of the seam 8 is above the overflow lip 26 of the crucible 4 when the crucible axis $A_T$—$A_T$ is vertical. This facilitates access to the crucible for maintenance, cleaning and charging purposes.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Induction furnace comprising:
a furnace body containing a gas-tight jacket,
a crucible (4) having a crucible axis ($A_T$—$A_T$) in the furnace body,
an induction coil in the furnace body,
a partite cover which is disposed on the furnace body and has at least one gas connection,
a pouring apparatus,
a flange connection for joining the furnace body and partite cover together releasably but hermetically,
a furnace frame having a tilting mechanism which engages the partite cover, the furnace body and partite cover being journaled in a joined state in the furnace frame, and after the flange connection is separated a part of the cover being removable from the furnace body, the cover having first rocking arms disposed on both sides and parallel to a pivot plane of the crucible axis ($A_T$—$A_T$),
first and second tilt bearings,
second rocking arms,
said first rocking arms being joined at their extremities via said first tilt bearings to said second rocking arms which are connected at extremities remote from the first tilt bearings via said second tilt bearings to the furnace frame, locking means for positively locking the first tilt bearings, the first tilt bearings being alternatively positively locked and unlocked such that the induction furnace is pivoted in opposite directions alternatively about the first tilt bearings when unlocked or about the second tilt bearings when the first tilt bearings are locked and that a common axis ($A_2$—$A_2$) of the second tilt bearings lies on the other side of the crucible axis ($A_T$—$A_T$) from a common axis ($A_1$—$A_1$) of the first tilt bearings with the furnace in the melting position.

2. Induction furnace according to claim 1, in which the common axes ($A_1$—$A_1$) and ($A_2$—$A_2$) of the two pairs of tilt bearings lie in one horizontal plane with the furnace in a vertical position.

3. Induction furnace according to claim 1, in which the cover is bipartite and includes a bottom part integral with the first rocking arms and includes a removable upper cover part, and a releasable flange joint joining the two parts together with a dividing seam lying between them.

4. Induction furnace according to claim 3, which includes, in the bottom part of the cover, a stopper by which the interior of the furnace can be closed up gas-tight during melting, and which includes, for the purpose of pouring, a replaceable pouring spout having an inlet end which is swung in front of an overflow lip of the crucible in lieu of the stopper, and said spout having an outlet opening disposed in a pouring trough.

5. Induction furnace according to claim 4, in which the outlet opening of the pouring spout is disposed at the common axis ($A_2$—$A_2$) of the second tilt bearings.

6. Induction furnace according to claim 3, in which the seam between the upper part of the cover and the lower part of the cover runs at an angle other than 90 degrees to the crucible axis ($A_T$—$A_T$), and a highest point of the seam (8) when the crucible axis ($A_T$—$A_T$) is upright lies above a pouring opening of the crucible.

7. Induction furnace according to claim 3, which includes, in the bottom part of the cover, an exhaust system which is disposed at the seam.

* * * * *